(No Model.) 2 Sheets—Sheet 1.
J. C. HENRY.
GEARING FOR ELECTRIC RAILWAY CARS.
No. 499,633. Patented June 13, 1893.
Fig. I
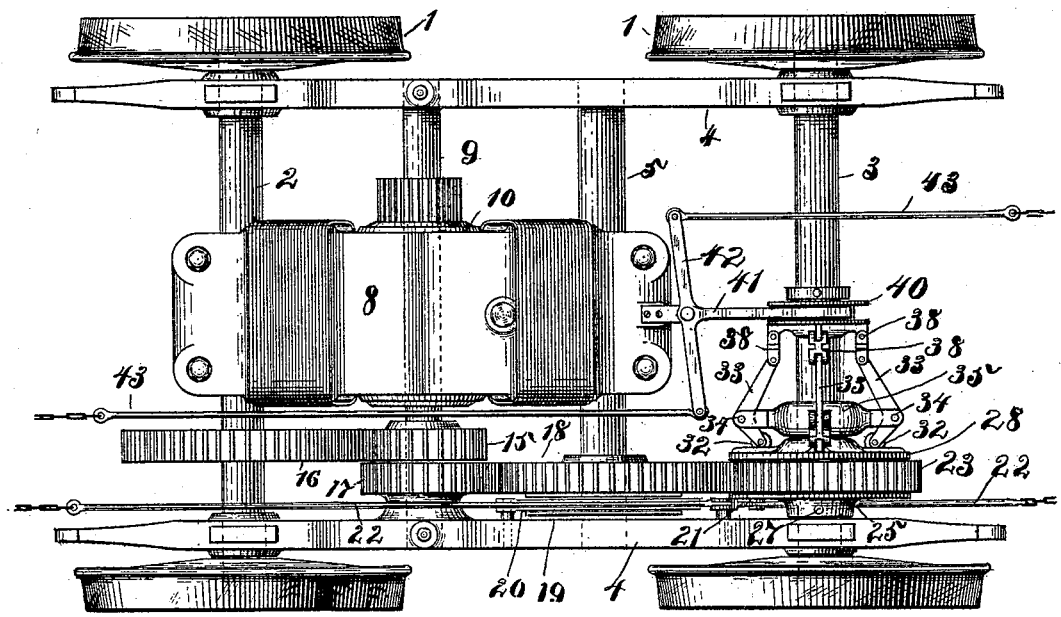
Fig. II
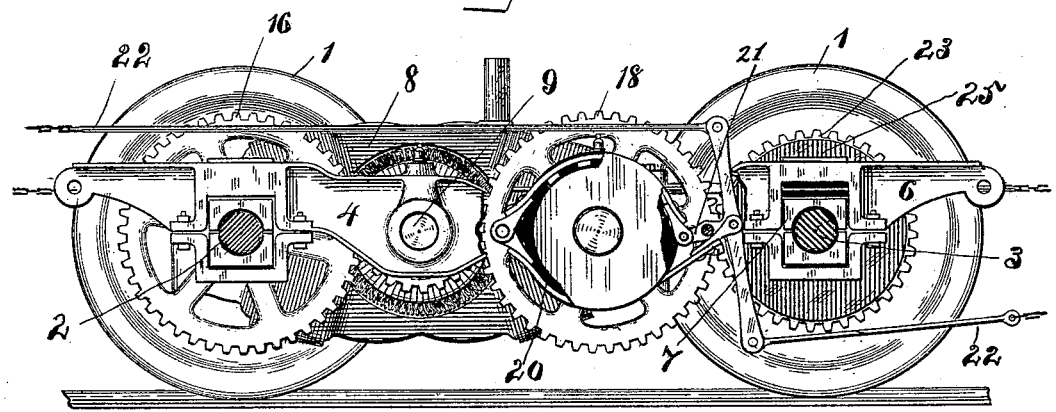
Witnesses:
Geo. H. Knight Jr.
M. V. Bidgood
Inventor:
John C. Henry
by Knight Bros
Att'ys.

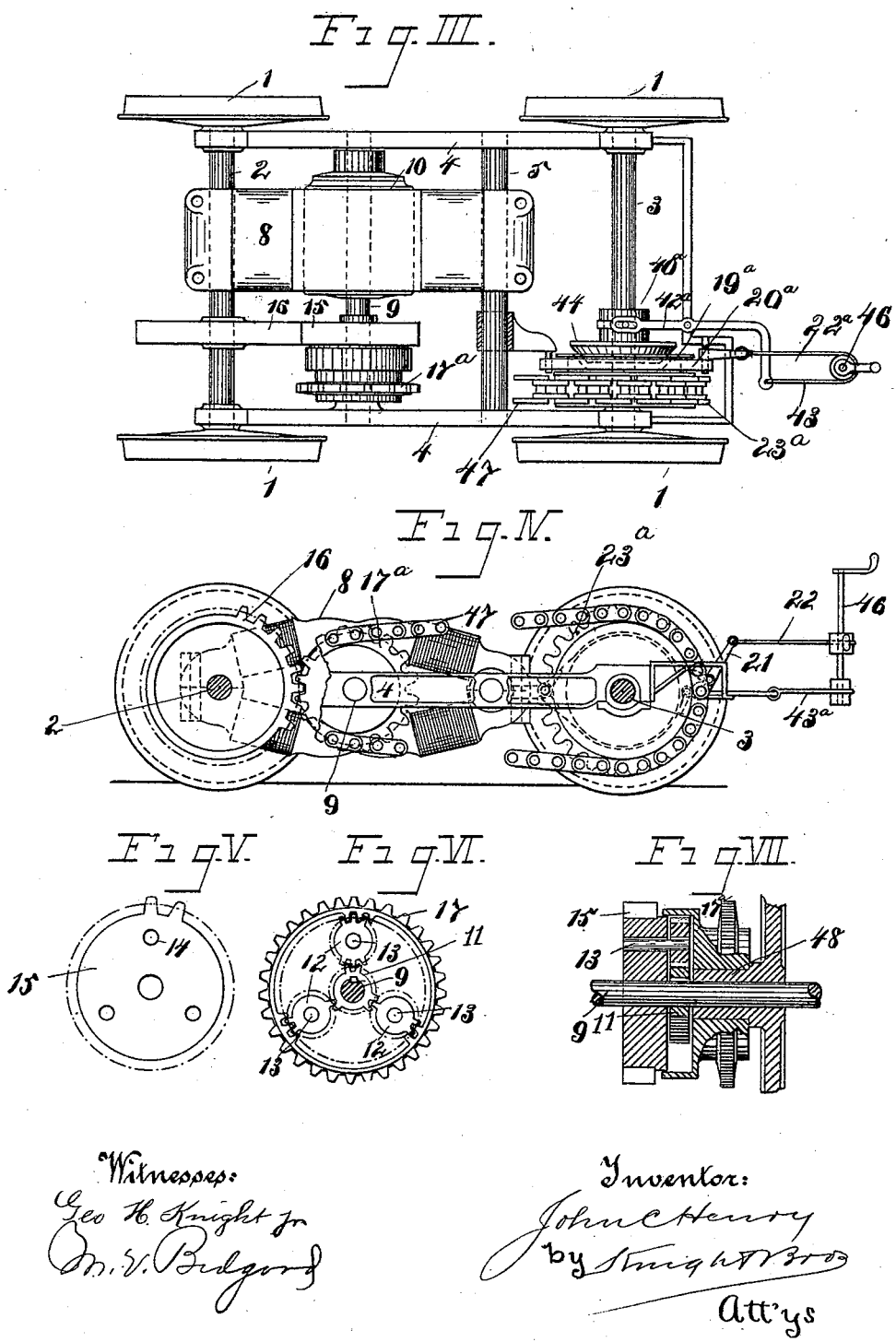

UNITED STATES PATENT OFFICE.

JOHN C. HENRY, OF NEW YORK, N. Y.

GEARING FOR ELECTRIC-RAILWAY CARS.

SPECIFICATION forming part of Letters Patent No. 499,633, dated June 13, 1893.

Application filed April 29, 1892. Serial No. 431,207. (No model.)

*To all whom it may concern:*

Be it known that I, JOHN C. HENRY, a citizen of the United States, residing in the city, county, and State of New York, have invented a certain new and useful Improvement in Gearing for Electric-Railway Cars, of which the following is a specification.

My invention is particularly directed to the improvement of the mechanical connection between the armature-shaft of the electric motor employed to drive a car and the axle or axles of said car, and the specific object of the present invention is the provision of mechanism for this purpose of such a character as to enable the grading of the rate of transmission of power to the axles in an inverse ratio to the work done or the load, and, when the car is running at slow speed, to distribute the traction over all four wheels; these modifications of the driving mechanism being effected during operation of the car, and without affecting the movement of the motor armature, which—whatever the speed of the car—continues to operate at a speed at which the motor is most efficient.

In carrying my invention into effect, I drive one car axle from the motor-shaft by means of gearing, or equivalent mechanical transmitting mechanism, whose connection to said motor-shaft is variable at will. The positiveness of the connection of the transmitting mechanism to this axle of the motor-shaft is regulated through the medium of secondary transmitting mechanism connecting the motor shaft to the other or another car-axle. The result of this construction is that when a positive connection is made between the armature-shaft and one axle, the power is transmitted to that axle alone, and at the highest rate of speed of the car; while if such connection is loosened or allowed to slip, a differential effect is obtained by the two transmitting mechanisms whereby power is applied to both axles of the car at a slow speed.

In the accompanying drawings,—Figure I is a plan view of a motor truck for an electric car embodying my invention. Fig. II is a sectional elevation of the same, the parts being broken away. Fig. III is a sectional plan view illustrating certain modifications. Fig. IV is a sectional elevation of this form of the invention. Fig. V is a side view of a gear-wheel of this form of the invention. Fig. VI is a partly sectional side view of the planetary gear. Fig. VII is an axial sectional view through the same, and contiguous parts.

1, 1 may represent the track wheels of the truck of an electric car. 2, 3 are the axles thereof.

4, 5 is the truck frame of which 4, 4 are longitudinal bars uniting the axles 2, 3 and having journals for said axles, and 5 is a crossbar uniting the longitudinal bars 4, 4. Preferably the support of the longitudinal bars 4, on the axle 3, is through the medium of springs, as indicated at 6, Fig. II, said springs being interposed between the brasses 7, surrounding the axle 3, and the bar 4, which is suitably chambered to receive both the brasses and springs. The field-magnets 8, of the electric motor are at one end hung upon the axle 2, and at the other upon the cross-bar 5, while the shaft 9 of its armature 10 is carried by, and journaled in, bearings in the longitudinal bars, 4.

Referring now to Figs. I, V, VI,—11 is a pinion keyed to the motor-shaft 9 and meshing with a desired number (three are here shown) of intermediate pinions 12, carried by pins 13 which are mounted at equal distances apart in bearings 14, (Fig. V,) in a gear wheel 15, which runs loosely on the armature-shaft 9, and intermeshes with the cog-wheel 16, on axle 2. The proportions of the gears 15, 16 are varied according to the reduction of speed necessary between the armature-shaft and car-axle. Exteriorly the intermediate pinions 12, travel in the teeth of an internal gear 17. By arresting the internal gear 17, more or less, while the intermediate pinions 12 are being driven through pinion 11 by the armature shaft, the said intermediate pinions are caused to revolve about the armature-shaft with greater or less speed, and so to transmit power at a corresponding speed to the gear-wheel 15 which carries said pinions 12, and to the cog 16, and axle 2, thus propelling the car. Up to this point the differential planetary driving-gear I have described differs only in details of construction from that which I have shown in other applications for Letters Patent, particularly ir my application, Serial No. 325,244, filed September 27, 1889, but the means of arrestin;

more or less the movement of the internal gear 17, which I will now describe, are novel. The means herein employed for this purpose are so connected to the axle 3 of the car, that in arresting the movement of the internal gear 17, they transmit power to said axle 3, so that the movement of the motor-shaft is divided between the two car-axles, and a differential effect is obtained, and so that the motor while working at maximum speed and highest efficiency, transmits power at lower than a normal speed to both car axles. The beneficial result is due not only to the running of the axle at a slow speed from the motor operating at high speed, but to the utilizing of all four of the car-wheels for the purpose of traction. While, therefore, a car is running with a heavy load, the motor may still continue to operate at its highest efficiency, and by this differential connection the power transmitted to the car-axles is doubled, or increased in proportion to the reduction in speed, and at the same time the traction is spread over all the wheels of the car, or truck. The internal gear 17 has exterior cogs or gear teeth, as well as interior. Said exterior teeth intermesh with the cogs of an idle gear 18, Figs. I and II, which runs loosely on the cross-bar 5, of the truck frame. It has rigidly connected with it a hub or band-wheel 19, which is surrounded by a brake-band 20, operated by toggle lever 21, and rods or chains 22, which have connection with brake-staffs or levers on one or both car-platforms, or at other location convenient to the motor-man. By tightening on this brake-band more or less, and so arresting more or less the movement of the cog-wheel 18, the motor-man regulates the movement of the internal gear 17, and consequently the positiveness of connection of the motor-shaft to axle 2. The cog-wheel 18 is arranged so as to intermesh with a gear-wheel 23 which runs loosely on the axle 3, and is adapted to be connected at will to said axle by any suitable clutch. By preference, however, I employ the form of clutch illustrated in Fig. I, which is more fully shown, described and claimed in my application, Serial No. 460,002, below referred to. It will be sufficient here to say that 25 is an iron disk held from rotation on axle 3, by spline and groove, or otherwise, and capable of being fixed rigidly to a desired position adjacent to the wheel 23 by a set-screw 27, or other means. 28 is a disk, also held from rotation on axle 3 by a spline and groove, but capable of axial movement on said axle. The back of the clamp or clutch disk 28, has radial grooves, which receive rollers 32, carried by the shorter arms of levers 33, which are fulcrumed at 34 in a yoke 35 held from rotation on and clamped to the axle 3 by spline and groove 36, and set-screw, or equivalent device. Any desired number of radial grooves and levers and corresponding parts may be used, but I have here indicated the employment of four, so that the action thereof on the clutch-disk 28 properly and evenly surrounds the axle 3. The longer arms of levers 33 are hinged to links 38 which are pivoted at 39 to a collar 40 connected to axle 3 by spline and groove, so as to be free to move axially thereon under the action of the yoke 41 carried by lever 42. The lever 42 is operated by rods or chains 43 running to brake-staffs or levers on one or both of the car platforms, or to other location convenient to the motor-man.

The operation of the invention is as follows:—When the brake-band 20 is slackened so as to release its wheel 19, the train of gears 17, 18 and 23 hereinafter referred to as secondary transmitting mechanism is freely driven by the motor-shaft without operating either car-axle, but when it is desired to start the car, clutch-disks 25, 28 are thrown in contact with the wear surfaces of the wheel 23 with gradually increasing pressure, thus gradually making a connection more or less positive, as desired, of the said wheel 23 with the axle 3. The rotation of the motor-shaft will now drive the gears 17, 18 and 23, and so drive the axle 3. But inasmuch as this throws work on to the gear 17, its motion will be partially retarded, and the intermediate pinions 12 traveling in the same, will transmit power through gears 15, 16 to the other axle 2. The two gears 15 and 17 will be differentially actuated, and the power transmitted to the two axles will be balanced automatically, so that they will be driven at equal speed, and with such a reduction of speed as to transmit great power to the axles while the motor is operating at full efficiency. Should now the speed be increased, or the load diminished, the clutch 23, 25, 28 can be disconnected, and the brake 20 applied so throwing out the connections to the axle 3, and transmitting all the power to the axle 2 at an accelerated speed. Thus, when a car is running at high speed, the connection of the motor-shaft to the axle is simplified and made more direct, while, when running at low speed the power is increased and is distributed over all the four wheels used, increasing the traction.

In Figs. III, IV and VII, certain additional features and modifications are shown. An ordinary form of clutch, 44, is here exhibited instead of the special and preferred form shown in Fig. I, and the connection of the band-brake 20ª on brake wheel 19ª and the clutch operating lever 42ª is made by the cables or chains 22ª, 43ª with a single brake-staff 46 on each car-platform, so that by turning said brake-shaft 46 in one direction, brake 20ª is applied, and by turning it in the other direction the clutch 44 is brought into action. Thus the disconnection of the high or slow speed gear automatically couples in the other gear. Other modifications here shown are as follows: The cog-wheel 17 is changed to a sprocket-wheel 17ª, and the idle cog 18 is omitted, power being transmitted from the sprocket-wheel 17ª, by a chain 47 directly to a sprocket-wheel 23ª on the axle 3. The brake-wheel 19ª is accordingly shifted also and formed on or connected to the sprocket-wheel 23ª, and the male member of the clutch 44 engages directly in a frictional seat provided in the brake-wheel 19ª, said male member 44 being formed on a collar 40ª, which is connected in the usual way to axle 3 by spline and groove. In this form of the invention the applying of the band-brake 20ª with sufficient force to stop the wheel 19ª, arrests the sprocket-wheel 23ª, which is loose on the axle 3, and so arrests the travel of chain 47 and sprocket 17ª, which carries the internal gear, so that the train of gear 15, 16, or equivalent transmitting mechanism, will drive the axle 2 at full speed, but if the band-brake 20ª be relaxed, and the clutch 44 applied by a reverse movement of the brake-staff 46, the internal gear and sprocket wheel 17ª are coupled to the axle 3, and a differential movement of the armature-shaft will be transmitted to both axles, as already described, with reference to Figs. I, II.

As shown in Fig. VII, the internal gear and sprocket-wheel 17ª, instead of being mounted directly on the motor-shaft 9, may be carried by a boss or tubular projection 48 on one of the longitudinal bars 4. This boss or projection forms a prolonged bearing for the motor-shaft in said bar.

It will be observed that with my apparatus the motor-shaft has fast and loose connection with both car-axles; for the driving of gear 16 on axle 2 by gear 15 is varied by the locking or releasing of gears 17 and 18 and the coupling of wheel 23 to axle 3 is effected by a simple clutch.

The improved clutch above-described is claimed in my application, Serial No. 460,002, filed January 28, 1893.

Having thus described my invention, the following is what I claim as new therein and desire to secure by Letters Patent:

1. The combination of car wheels and axles, a motor having variable connections with one axle, and means, adapted to be manually operated, connected with the other axle for varying the positiveness of connection with the first axle.

2. The combination of a pair of axles, a motor, fast and loose connection between the shaft of said motor and one of said axles, means for varying said fast and loose connections, secondary transmitting mechanism driven by the first, and means for connecting such secondary transmitting mechanism to the other axle.

3. The combination of a pair of axles, a differential gear having fast and loose connection with one axle, mechanism for arresting one element of said gear, secondary transmitting mechanism connected with said element, and means of connecting said secondary transmitting mechanism to the other car axle.

4. The combination of a pair of axles, a motor, differential gear having fast and loose connection with one axle, secondary transmitting mechanism connected to said differential gear, and a clutch for connecting said secondary transmitting mechanism to the other axle.

5. The combination of a pair of axles, a motor, differential transmitting mechanism having fast and loose connection with the shaft of said motor and one axle, means for controlling said fast and loose connections direct, secondary transmitting mechanism, means for connecting said secondary transmitting mechanism to an axle, and the staff or lever connected both to the means of direct control of the differential transmitting mechanism, and to the means of connecting the secondary transmitting mechanism to the other axle, whereby a movement of said staff or lever in one or the other direction will couple the motor-shaft to one or both axles.

6. The combination of a pair of axles, a motor, differential gear connected to one axle, and comprising an internally geared cog-wheel 17, and driving pinions 11, 12, an idle cog-wheel 18, in gear with said wheel 17, a brake-wheel 19 connected to said cog-wheel 18, and means of braking said wheel 19.

7. The combination of a pair of axles, a motor having shaft 9, differential driving gear 11, 12, 17 connected to one axle, idle cog-wheel 18, brake and brake-wheel 20, 19; cog-wheel 23 on the other axle and a clutch for connecting cog-wheel 23 to said axle.

JOHN C. HENRY.

Witnesses:
HARRY E. KNIGHT,
M. V. BIDGOOD.